June 28, 1932.   W. C. DAVIS   1,864,983
SAFETY GLASS
Filed April 10, 1929
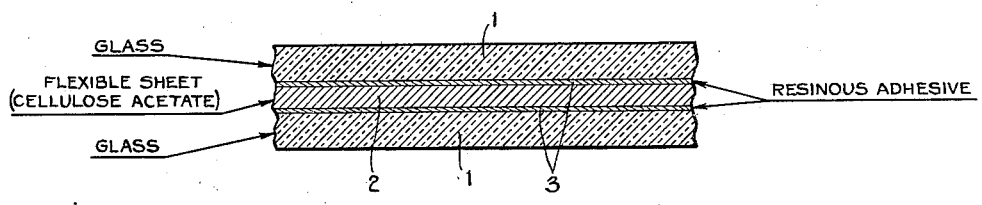
INVENTOR
William Charles Davis Patented June 28, 1932

1,864,983

UNITED STATES PATENT OFFICE

WILLIAM CHARLES DAVIS, OF LONDON, ENGLAND

SAFETY GLASS

Application filed April 10, 1929. Serial No. 354,078.

This invention relates to safety glass and methods of preparing the same, and is particularly directed to a safety glass comprising outer sheets of glass adhering to an intermediate central layer of elastic material.

In the usual method of preparing safety glass, a sheet of glass is caused to adhere to each side of a sheet of elastic transparent material such as nitrocellulose or cellulose acetate, but in the ordinary course of manufacture it is difficult to obtain an adhesive sufficiently adherent, transparent and colorless to produce satisfactory results.

I have found that certain synthetic resins when mixed with a cellulose ester such as nitrocellulose or cellulose acetate in appropriate solvents form adhesives well adapted for use in the manufacture of safety glass. The solution so prepared may contain 6 to 8 parts cellulose ester and 2 to 5 parts of synthetic resin per 100 parts of total solution, although it is apparent that I do not limit myself to these proportions.

The synthetic resins I prefer to use are those resins known as the urea type resins, this group including the resins prepared by condensing together urea, thiourea or other derivatives of urea with or without dicyandiamid, or suitable mixtures of these compounds, with formaldehyde or its polymers. However, I do not confine myself to any one resin since I may use a synthetic resin or a mixture of resins made by condensing together with formaldehyde or its polymers, urea or thiourea or other urea substitutes or mixtures of these either with or without dicyandiamid, carrying out the condensation either in aqueous solution or in organic solvents.

In the accompanying drawing the figure is a sectional view of a segment of safety glass prepared in accordance with the invention.

In the drawing the composite glass is shown as comprising sheets of glass 1, flexible and transparent intermediate sheet 2 cemented to sheets 1 by means of resinous adhesive 3.

According to the present invention the adhesive solutions are painted or otherwise coated on one surface of each of two pieces of glass 1, the coating 3, thus formed, is dried and there is then placed between the sheets of glass a central layer of elastic transparent material 2, the coating 3 of the glass being adjacent the elastic sheet or layer. The composite sheet is subjected to suitable pressure at a temperature below the softening point of the central elastic sheet 2 for a predetermined time and is then cooled while still under pressure. The composite sheet is then removed from the press and is in a condition for use.

To obtain a finished product of greatest transparency, it is preferred, but not necessary, that the adhesive solutions should be free from suspended or undissolved synthetic resin, and to this end I prefer to prepare my adhesive solutions by using only that portion of the previously formed synthetic resin which is soluble in the solvents used or, in the alternative, to form the synthetic resins in a suitable solvent, which solvent is used in making the finished adhesive solution.

The following examples illustrate several methods of preparing the synthetic resins and the adhesive solutions although it is understood that these examples are given merely by way of illustration and not in limitation:

*Example 1*

10 parts dicyandiamid;
28 parts thiourea;
22 parts urea;
126 parts commercial formalin (40% by volume) are dissolved by shaking in the cold or by gentle warming, 1.4 parts formic acid are added and the mixture evaporated at 70° C. until the mixture corresponds to 134 parts by weight.

10 parts of the synthetic resin so prepared are shaken with 50 parts acetone and to 37 parts of the clear extract are added 6.1 parts of low viscosity nitrocellulose dissolved in a mixed solvent containing 16.5 parts acetone, 12 parts alcohol, 18 parts benzene, 1.8 parts benzyl alcohol, 9 parts mono-ethyl ether of ethylene glycol and 5 parts butyl phthalate.

*Example II*

2.5 parts dicyandiamid;
7 parts thiourea;
5.5 parts urea;
12 parts paraformaldehyde;
180 parts acetone are boiled under a reflux condenser for 8 hours. To 20 parts of this solution are added 6.1 parts of low viscosity nitrocellulose dissolved in 100 parts of the mixed solvents of Example 1.

*Example III*

2.5 parts dicyandiamid;
7 parts thiourea;
5.5 parts urea;
12 parts paraformaldehyde are boiled under a reflux condenser for 8 hours, with a mixture of 300 parts acetone, 100 parts benzol, 68 parts alcohol, 50 parts mono-ethyl ether of ethylene glycol, 30 parts butyl phthalate, and 10 parts benzyl alcohol. To 100 parts of the resulting solution are added 11 parts low viscosity nitrocellulose.

The adhesive solutions described in the examples are painted, flowed or otherwise spread on one side of each of the sheets of glass 1 to be used and the coating allowed to dry for a period of from 2 to 10 minutes. A central layer of cellulose acetate sheet 2 is applied between two of the sheets of glass, the coated portions 3 being adjacent the cellulose acetate sheet and the composite glass is placed in a hydraulic press under a pressure of about 500 lbs. per sq. in. Heat is applied to the press and is maintained until the temperature of the glass reaches about 50° C. when the sample is cooled. The pressure is maintained throughout the heating and cooling operation. The composite glass is removed from the press and is then ready for use.

Any suitable solvents may be used in making up the adhesive solutions. For instance, I may use a mixture containing acetone, alcohol or other low boiling solvents which have a solvent action on synthetic resins and/or the cellulose ester such as nitrocellulose or cellulose acetate, the said low boiling solvent being modified by the addition of high boiling solvents such as mono-ethyl ether of ethylene glycol and butyl phthalate, and of non-solvents such as benzene. If desired, suitable plasticizers, softeners, etc. may be utilized.

Any suitable changes may be made in proportions, temperatures, time of treatment, and other details without departing from the spirit and scope of the invention except as defined in the appended claims.

What I claim is:

1. A safety glass comprising two sheets of glass with a sheet of an elastic transparent material therebetween, and a urea-thiourea-dicyandiamid resin-cellulose ester adhesive composition binding the glass sheets to said intermediate sheet.

2. A safety glass comprising two sheets of glass with a sheet of cellulose acetate therebetween, and a urea-thiourea-dicyandiamid resin-cellulose nitrate adhesive composition binding the glass sheets to said cellulose acetate sheet.

3. A safety glass comprising two sheets of glass with a sheet of cellulose acetate therebetween, and a urea-thiourea-dicyandiamid resin-cellulose acetate adhesive composition binding the glass sheets to said cellulose acetate sheet.

In testimony whereof, I have hereunto subscribed my name this 5th day of April, 1929.

WILLIAM CHARLES DAVIS.